Patented Mar. 11, 1924.

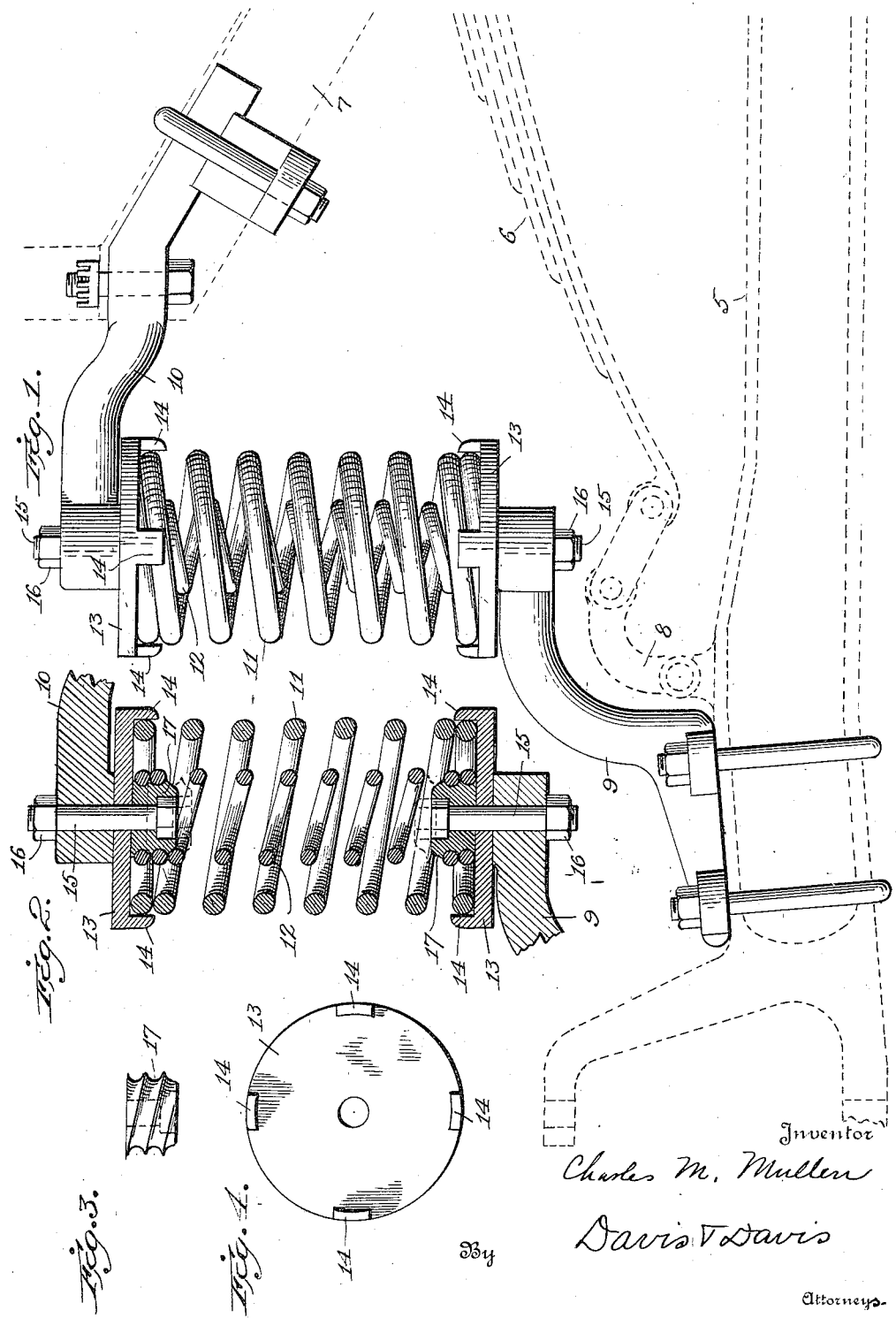

1,486,295

UNITED STATES PATENT OFFICE.

CHARLES M. MULLEN, OF KOKOMO, INDIANA.

VEHICLE SPRING.

Application filed April 16, 1923. Serial No. 632,515.

*To all whom it may concern:*

Be it known that I, CHARLES M. MULLEN, a citizen of the United States of America, and a resident of Kokomo, county of Howard, and State of Indiana, have invented certain new and useful Improvements in Vehicle Springs, of which the following is a full and clear specification.

The object of this invention is to provide simple and inexpensive spring means for supplementing the usual, main springs of a vehicle to increase resiliency and at the same time provide for checking undue rebound action, as more fully hereinafter set forth.

In the drawing—

Fig. 1 represents a side elevation of my device showing it applied to one of the front corners of a motor car;

Fig. 2 is a sectional view of the device;

Fig. 3 is a side elevation of the screw plug;

Fig. 4 is a plan view of one of the spring-supporting disks.

I have shown my device applied to one front corner of a motor vehicle, but it will be understood that it is to be applied to the other front corner and that it may also be applied to the rear corners, if desired.

In the drawing, 5 designates part of the front axle of a Ford car, and 6 the main semi-elliptical spring arranged to support the front end 7 of the body of the vehicle, this spring being shackled to an upstanding bracket 8 on the axle.

Bolted to the axle at a point between the bracket 8 and the steering-knuckle is an arm 9 which extends inwardly to a point just over the shackle and is there provided with a vertical bolt-hole. Affixed to the adjacent corner of the body is another arm 10 which extends outwardly from the body and is provided with a vertical bolt-hole in alinement with the bolt-hole in the lower arm.

Arranged between the ends of the arms 9 and 10 is a spring device consisting of an outer coil-spring 11 and a lighter inner coil-spring 12. The main or outer spring 11 bears against the inner faces of two disks 13 which are respectively clamped against the adjacent faces of the arms 9 and 10 and are provided with central holes registering with the bolt-holes in the arms, each of these disks being also provided with marginal lugs 14 for engaging the outer faces of the end coils of the spring to hold the coils from lateral movement on the disks.

Each disk is clamped to its arm by means of a bolt 15 extending through the bolt-hole in the arm and provided on its outer end with a nut 16. The inner end of the bolt is headed and this head rests in an angular socket formed in the inner face of a plug 17 which is threaded externally to enable it to be screwed into the adjacent end of the inner spring. The screw-plugs 17 are drawn by the bolts against the inner faces of the disks 13, thus not only anchoring the ends of the inner spring but also serving to clamp the disks 13 hard against the arms 9 and 10. The ends of the main spring 11 are not clamped to the disk 13, but are held freely thereagainst by the load and the tension of the inner spring 12. This inner spring 12 is made a little shorter than the outer spring, so that when the bolts 15 are tightened, this inner spring will be under tension when the vehicle is not loaded. When a load is placed upon the vehicle, the outer spring will, of course, be compressed to a degree commensurate with the load, and at a predetermined point the inner spring will contract to its normal length and will then become a load-sustaining spring, to thereby assist the spring 11 in supporting the load. It is, however, in the rebound action that the essential function of the inner spring is realized. In rebound action, when the outer spring 11 expands about to its normal length, the inner spring is then under tension and will thus serve to resiliently check undue rebound of the body of the vehicle.

It will also be observed that when two of my spring appliances are applied to the opposite sides of the vehicle, they afford a much broader bearing for the vehicle body and thus not only resiliently take up undue side-rocking action, but also render tipping over of the vehicle highly unlikely. It will be observed also that in my construction I do not employ any rubbing parts and thus I eliminate noise and wear and also the necessity for the use of a lubricant. The free connection of the spring 11 with its confining disks 13 conduces to a very light running of the vehicle.

What I claim as new is:

1. In a vehicle spring appliance, an arm attached to the axle extending inwardly toward the center of the vehicle, another arm attached to the body of the vehicle and extending outwardly so as to lie in substantially the same vertical plane as the beforementioned arm, bearing-plates attached to said arms, a load spring having its opposite ends bearing against said plates, and a coil tension spring enclosed within the load spring and having its opposite ends anchored to said plates.

2. In combination with a vehicle, a supplemental spring device consisting of supporting members, one on the body and one on the axle, a tension-rebound-spring connecting said members, the connecting devices consisting of a screw-plug screwed into each end of the spring, a clamping bolt, a load-sustaining coil-spring surrounding said tension-spring, and disks clamped to said members by the aforesaid bolts and adapted to engage the end-coils of said load-sustaining spring.

In testimony whereof I hereunto affix my signature.

CHARLES M. MULLEN.

Witnesses:
  ROY A. BOSTON,
  JOHN A. BARTHOLOMEW.